US010118469B2

(12) United States Patent
Hoelzel et al.

(10) Patent No.: US 10,118,469 B2
(45) Date of Patent: Nov. 6, 2018

(54) ROLLER BLIND ARRANGEMENT HAVING LATERAL GUIDANCE

(71) Applicant: Webasto SE, Stockdorf (DE)

(72) Inventors: Dominik Hoelzel, Stockdorf (DE);
Andreas Rockelmann, Stockdorf (DE);
Thomas Schuett, Stockdorf (DE);
Susanne Schandel, Stockdorf (DE)

(73) Assignee: WEBASTO SE, Stockdorf (DE)

(*) Notice: Subject to any disclaimer, the term of this patent is extended or adjusted under 35 U.S.C. 154(b) by 0 days.

(21) Appl. No.: 15/307,754

(22) PCT Filed: Apr. 28, 2015

(86) PCT No.: PCT/EP2015/059190
§ 371 (c)(1),
(2) Date: Oct. 28, 2016

(87) PCT Pub. No.: WO2015/173007
PCT Pub. Date: Nov. 19, 2015

(65) Prior Publication Data
US 2017/0050499 A1    Feb. 23, 2017

(30) Foreign Application Priority Data
May 16, 2014  (DE) .................. 10 2014 106 950

(51) Int. Cl.
*B60J 1/00* (2006.01)
*E06B 9/40* (2006.01)
(Continued)

(52) U.S. Cl.
CPC ........... *B60J 7/0015* (2013.01); *B60J 1/2027* (2013.01); *B60J 1/2061* (2013.01); *B60J 7/067* (2013.01)

(58) Field of Classification Search
CPC ........ B60J 7/0015; B60J 7/067; B60J 1/2027; B60J 1/2061
(Continued)

(56) References Cited

U.S. PATENT DOCUMENTS 6,691,761 B1* 2/2004 Alkhoury .................. E06B 9/54
160/273.1
6,899,380 B2* 5/2005 Kralik .................... B60J 7/0015
160/273.1
(Continued)

FOREIGN PATENT DOCUMENTS

DE   10 2006 054 881 A1   5/2008
DE   10 2008 035514 A1    2/2010
(Continued)

OTHER PUBLICATIONS

International Preliminary Report on Patentability issued against corresponding International Application No. PCT/EP2015/059190 dated Dec. 1, 2016.
(Continued)

*Primary Examiner* — Katherine W Mitchell
*Assistant Examiner* — Johnnie A. Shablack
(74) *Attorney, Agent, or Firm* — Fitch, Even, Tabin & Flannery, LLP

(57) ABSTRACT

A roller blind arrangement for a motor vehicle for shading a transparent vehicle section having a roller blind web which can be wound up to form a roller blind winding and is guided at its lateral edges in relation to a vertical longitudinal center plane of the roller blind in each case in a guide rail, as well as a drive device having a drive pinion which drives two driving means each of which is guided in a guide track of one of the guide rails. The driving means are each designed as a toothed belt which has an essentially rectangular cross section and comprises a toothing on at least one side, the
(Continued)

teeth of said toothing extending at least approximately perpendicular to the plane of the unwound roller blind web between a lower side of the toothed belt and an upper side of the toothed belt.

14 Claims, 4 Drawing Sheets

(51) Int. Cl.
  *B60J 7/00* (2006.01)
  *B60J 1/20* (2006.01)
  *B60J 7/06* (2006.01)
(58) Field of Classification Search
  USPC .................................................. 160/273.1
  See application file for complete search history.

(56) References Cited

U.S. PATENT DOCUMENTS

| | | | | |
|---|---|---|---|---|
| 7,798,568 B2* | 9/2010 | Keller | ............... | B60J 7/0015 |
| | | | | 160/273.1 |
| 7,967,052 B2* | 6/2011 | Lin | ............... | B60J 7/0015 |
| | | | | 160/273.1 |
| 8,256,492 B2* | 9/2012 | Lin | ............... | B60J 7/0015 |
| | | | | 160/370.22 |
| 8,590,593 B2* | 11/2013 | Kitani | ............... | B60J 1/2052 |
| | | | | 160/264 |
| 8,708,025 B2* | 4/2014 | Coenraets | ............... | A63C 9/12 |
| | | | | 160/273.1 |
| 2004/0040676 A1* | 3/2004 | Engl | ............... | B60J 1/2044 |
| | | | | 160/370.22 |
| 2008/0142172 A1* | 6/2008 | Hansen | ............... | B60J 7/0015 |
| | | | | 160/270 |
| 2009/0165965 A1* | 7/2009 | Bergmiller | ............... | B60J 1/2044 |
| | | | | 160/370.21 |
| 2010/0288452 A1* | 11/2010 | Coenraets | ............... | E06L 39/13 |
| | | | | 160/309 |
| 2013/0328344 A1* | 12/2013 | Kitani | ............... | B60J 3/0204 |
| | | | | 296/97.4 |
| 2014/0116631 A1 | 5/2014 | Zeo et al. | | |
| 2015/0224857 A1* | 8/2015 | Calkins | ............... | B60J 1/2052 |
| | | | | 160/266 |
| 2017/0050499 A1* | 2/2017 | Hoelzel | ............... | B60J 1/2027 |

FOREIGN PATENT DOCUMENTS

| | | |
|---|---|---|
| DE | 10 2012 219523 A1 | 4/2014 |
| EP | 1 923 245 A2 | 5/2008 |
| FR | 779772 A * | 10/1934 |
| WO | WO 2017/055224 A1 * | 4/2017 |

OTHER PUBLICATIONS

International Search Report for PCT/EP2015/059190 dated Aug. 24, 2015; English translation submitted herewith (5 Pages).

* cited by examiner

ROLLER BLIND ARRANGEMENT HAVING LATERAL GUIDANCE

CROSS-REFERENCE TO RELATED APPLICATIONS

This application is a U.S. national phase application filed under 35 U.S.C. § 371 of International Application No. PCT/EP2015/059190, filed Apr. 28, 2015, designating the United States, which claims priority from German Patent Application No. 10 2014 106 950.1 filed May 16, 2014, which are hereby incorporated herein by reference in their entirety for all purposes.

FIELD

The invention relates to a roller bind arrangement for a motor vehicle for shading a transparent vehicle section according to the features of the preamble of claim 1.

BACKGROUND

Such a roller blind arrangement is known from Document DE 10 2006 054 881 A1 and comprises a roller blind web which can be unwound from a winding device for shading a transparent roof cutout of the relevant motor vehicle or wound up onto the winding device for uncovering the transparent roof cutout, respectively. At an edge that extends in the transverse direction of the vehicle, the roller blind web is joined to the winding device in particular being designed as a winding shaft. At its edges that are arranged on both sides in relation to a vertical longitudinal center plane of the vehicle, the roller blind web has guide straps which are in each case guided in one guide rail extending in the longitudinal direction of the vehicle. In this way, the roller blind web can be kept tensioned in the transverse direction of the vehicle. For actuation, the roller blind arrangement can have a drive motor which drives drive cables constituting two driving means which have a round cross section and which are each guided in one of the guide rails to a tension bow which is arranged at the edge of the roller blind web facing away from the winding device. The driving cables formed as gradient cables simultaneously form the lateral guide straps of the roller blind web by wrapping the roller blind web around the driving cables by means of a complex device when the roller blind web runs into the guide rails. The driving cables dig into the roller blind web via a rough brush-like surface which is formed by a plurality of fine bristles. Wrapping the roller blind web around the driving cables as well as digging the bristles into the roller blind web lead to a high wear of the roller blind web.

SUMMARY

It is the object of the invention to create a roller blind arrangement being configured in accordance with the type referred to in the introduction which enables simultaneously using driving means as driving elements and as guide elements of the roller blind web in a constructively simple manner.

In accordance with the invention, this object is attained by the roller blind arrangement having the features according to claim 1.

Consequently, the essence of the invention is that the roller blind web within the guide tracks of the guide rails is pressed between the lower side of the toothed belt and the bottom of the guide track by the driving means formed as toothed belts. This leads to an at least approximately U-shaped reshaping of the roller blind web within the guide tracks. When the roller blind web is running into the guide tracks of the guide rails, the reshaping is effected solely by the toothed belts also running into the guide tracks, said toothed belts pressing the roller blind web into the guide tracks. Due to the redirecting or reshaping, the roller blind web can in turn encroach on the tooth edges of the toothing arranged on at least one side of the corresponding toothed belt, so that the roller blind web can be kept tensioned transverse to the pull-out direction. The toothing of the toothed belts can therefore engage directly into the material of the roller blind web and get caught there. Moreover, the toothed belts can exert a high retaining strength on the roller blind web. Simultaneously, an actuation of the toothed belts can effect a winding up or unwinding of the roller blind web and does this with little force. Since the redirecting of the roller blind web can be limited and the material of the roller blind web has a certain elasticity, a wrinkle-free winding up of the roller blind web to form a roller blind winding is ensured.

The toothed belts, which have an essentially rectangular cross section, can be installed upright in relation to the plane of the roller blind web. Thus, the guide rails, in which the toothed belts are guided, can be designed correspondingly narrow, so that they do not, or only minimally, impede the viewing area of the transparent vehicle section.

In a preferred embodiment of the roller blind web according to the invention, the guide tracks also have in each case an essentially rectangular cross section which corresponds to the cross section of the corresponding toothed belt, wherein the roller blind web is wound up into the guide tracks via a corresponding lateral slot and is arranged in the guide tracks in each case between the corresponding guide rails and the corresponding toothed belts.

In order to be able to realize in each case the approximately U-shaped or reverse U-shaped redirection of the roller blind web in the guide tracks, the slot is expediently spaced to the bottom or the top, respectively, of the corresponding guide track.

The slot, by means of which the roller blind web is wound up into the corresponding guide track, can be spaced from the bottom as well as from the top of the corresponding guide track.

In an alternative embodiment, however, the slot is spaced from the bottom of the corresponding guide track and reaches to the top of the corresponding guide track or is spaced from the top of the corresponding guide track and reaches to the bottom of the corresponding guide track. Generally, it is therefore possible that the guide track has a peripheral wall when taking the opening determined by the slot into consideration, said peripheral wall having a cross section at least approximately C-shaped or G-shaped, in the broadest sense.

In order to be able to essentially preclude a jamming or entangling of an edge section of the roller blind web, the guide rails comprise in each case a tab guide at the side facing away from the slot, a corresponding edge strip of the roller blind web engaging into said tab guide.

For an easier installation and for ensuring a trouble-free operation of the roller blind arrangement according to the invention, the toothed belts comprise in each case a toothing on two sides facing away from each other. Thus, a symmetric design of the roller blind web guide arrangements arranged on both sides can be realized when using a single drive pinion for the two toothed belts.

In order to be able to realize a standardized roller blind web guide for various types of motor vehicles, a specific embodiment of the roller blind arrangement according to the invention comprises a roller blind web which comprises in each case a guide strap at the lateral edges in relation to the vertical longitudinal center plane of the roller blind, said guide strap being connected to a central portion of the roller blind web and being guided in the corresponding guide rail. The guide straps of the roller blind web can be a so-called standardized fabric module, which may be employed in roller blind arrangements according to the invention independently of the material forming the viewing surface of the roller blind web and forming the central portion. Thus, the same friction parameters within the guide rails that are preferably equally designed in a standardized manner can be realized at all times.

In order to be able to drive the roller blind arrangement as quietly and with as little friction as possible, the toothed belts are expediently guided in each case between the drive pinion and the corresponding guide rail at least mostly without twisting.

In order to keep the building height of the guide rails low, the toothed belts can in each case have a cross section whose height/width ratio is between 0.9 and 1.1, preferably approximately 1. This embodiment is possible, in particular when the lateral slots of the guide rails, by means of which the roller blind web runs into the guide tracks in the transverse direction, reach to the top of the corresponding guide track or to the bottom of the corresponding guide track. The toothed belts have in each case, for example, a height between approximately 4 mm and 8 mm, so that the guide tracks can be realized correspondingly low. Due to the fabric tensioning of the roller blind web in the transverse direction of the roller blind, the toothed belts are exposed in each case to a torsional moment around their corresponding longitudinal axis. The toothed belts support themselves in each case at the walls of the guide tracks via their corner surfaces facing in direction of the torsional moment. Thus, a distortion of the toothed belts in the guide tracks is prevented. An appropriate design of the corresponding guide surfaces of the toothed belts and the guide rails ensures a guiding of the toothed belts low in friction.

The driving means formed by the toothed belts can in each case be guided to a tension bow which is arranged at the edge of the roller blind web facing away from the roller blind winding. The main tractive force is exerted on the roller blind web via the tension bow, which is actuated by the driving means, when unwinding the roller blind web.

In an expedient embodiment of the roller blind arrangement according to the invention, the tension bow is provided in each case with a coupling element on both sides, which is connected to the corresponding toothed belt, in relation to the longitudinal center plane of the roller blind.

Connecting the coupling elements to the toothed belts can occur in such a manner that they engage in each case in a recess of the corresponding toothed belt in an interlocking manner.

In order to keep the number of individual parts of the roller blind arrangement at a minimum, the coupling elements are formed in each case onto the corresponding toothed belt according to an injection molding method in a specific embodiment of the roller blind arrangement according to the invention. Thus, the coupling elements are not necessary as individual parts but are rather a component of the toothed belt.

Further advantages and advantageous configurations of the subject matter of the invention can be taken from the description, from the drawing and from the claims.

BRIEF DESCRIPTIONS OF THE DRAWINGS

In the drawing, an exemplary embodiment of a roller blind arrangement according to the invention is illustrated in a schematically simplified way and will be explained in more detail in the following description. In the figures.

DETAILED DESCRIPTION

Figure 1:
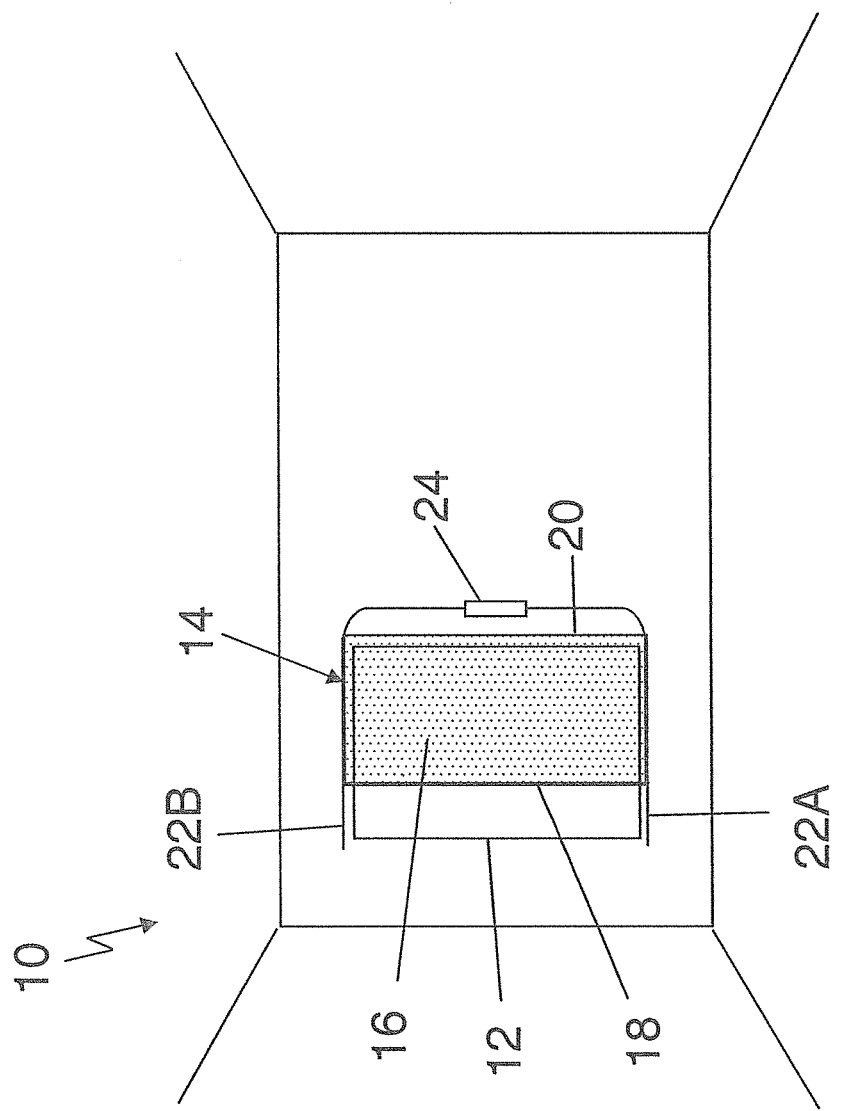
FIG. 1 shows a schematic view from above onto a roof of a motor vehicle having a roller blind arrangement according to the invention.

In the drawing, a vehicle roof 10 is shown which otherwise shows a passenger car not being illustrated in more detail and which has a roof cutout 12 which can be closed or at least partially uncovered by means of a transparent lid member not being illustrated in more detail here and pertaining to a roof opening system.

For shading the roof cutout 12, the vehicle roof 10 comprises a roller blind arrangement 14 which comprises a roller blind web 16 made from a fabric that can be folded or wound up, respectively.

At its free face side, the roller blind web 16 has a tension bow 18 extending in the transverse direction of the vehicle. At its edge facing away from the tension bow 18, the roller blind web 16 is fastened to a winding shaft 20 extending in the transverse direction of the vehicle. The winding shaft 20 comprises a winding tube which is mounted so as to be rotatable and which is pretensioned by means of a winding spring not illustrated in more detail here in the winding-up direction of the roller blind web 16, so that the roller blind web 16 automatically winds up on the winding shaft 20 to form a roller blind winding when the tension bow 18 is released or when the tension bow 18 is accordingly advanced in the direction of the winding shaft 20, respectively.

For guiding the tension bow 18 and for laterally guiding the roller blind web 16, the roller blind arrangement 14, in relation to a vertical longitudinal center plane of the roof or roller blind, respectively, comprises in each case a guide rail 22A or 22B, respectively, extending on both sides of the roller blind arrangement 14 in the longitudinal direction of the vehicle or in the direction in which the roller blind web 16 is extended along the relevant lateral edge of the roof cutout 12, respectively. The guide rails 22A and 22B can be a part of the roof opening system or also only be assigned to the roller blind arrangement 14.

For actuation, the roller blind arrangement 14 comprises an electrical drive motor 24 which drives a drive pinion 26 whose axis is perpendicular to the plane of an extended portion of the roller blind web 16. For force transmission, the drive pinion 26 engages two plastic toothed belts 28A or 28B which constitute driving means of the roller blind arrangement 14. The plastic toothed belts 28A and 28B are in each case guided into a guide channel 30 of the relevant guide rail 22A and 22B, respectively, via a curved track without twisting originating from the drive pinion 26 as well as guided and connected to the tension bow 18 in the guide track 30.

The plastic toothed belts 28A and 28B are toothed belts which comprise in each case a toothing 32 and 34, respectively, at two sides opposing each other, wherein the toothing of the plastic toothed belt 28A arranged outward in relation to the roller blind web 16 and the toothing of the plastic toothed belt 28B arranged inward in relation to the roller blind web 16 engages with the drive pinion 26. The toothing 32 and 34 have in each case teeth which extend perpendicular to the plane of the roller blind web 16 from an upper side of the toothed belt and a lower side of the toothed belt.

Figure 3:
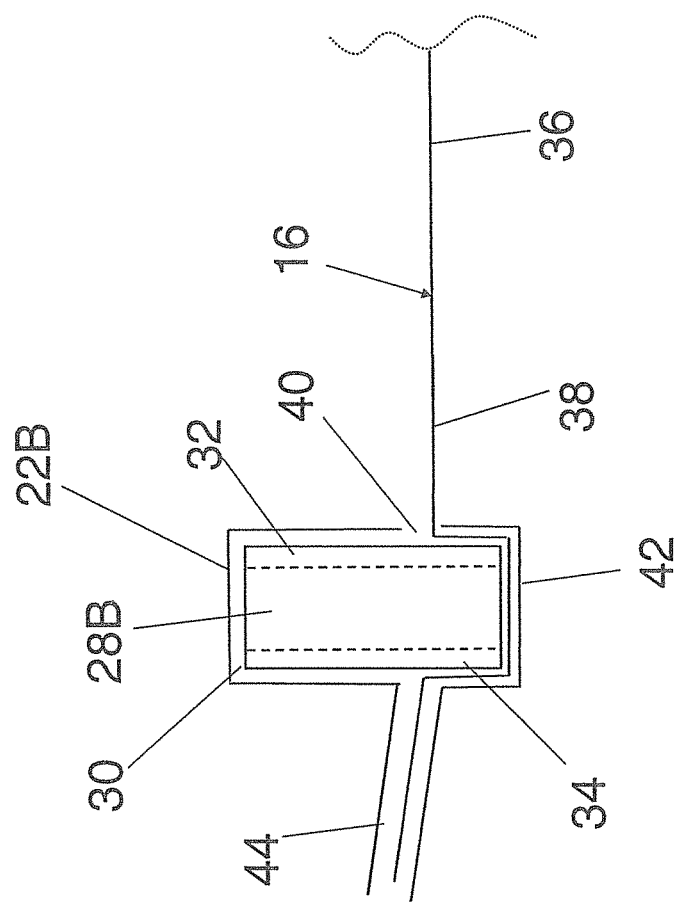
FIG. 3 shows a section through the roller blind arrangement along line in FIG. 2.

As can be seen in FIG. 3, the toothed belts 28A and 28B have in each case an essentially rectangular cross section which corresponds to an essentially rectangular cross section of the corresponding guide track 30 of the corresponding guide rail 22A and 22B, respectively. The toothings 32 and 34 are arranged at the lateral longitudinal sides of the toothed belt, in relation to the cross section, which are connected to each other via the lower side and the upper side.

The roller blind web 16 comprises a central portion 36 which forms the viewing surface of the roller blind web 16. At its edges arranged on both sides in relation to the vertical longitudinal center plane of the roof, the central portion 36 is provided on both sides in each case with a guide strap 38 which constitutes a so-called fabric module which can be formed in a standardized manner in connection with the guide rails 22A and 22B. The roller blind web 16 is guided in the guide rails 22A and 22B via the guide straps 38. For this purpose, each of the guide straps 38, which are sewn in each case to the central portion 36, run into the guide track 30 of the relevant guide rail 22A and 22B, respectively, via a slot 40 extending in the longitudinal direction of the rail. There, the guide strap 38 is deviated at least approximately U-shaped in relation to the transverse direction of the roof, meaning as shown in the section according to FIG. 3, so that the guide strap 38 is pressed between the lower side of the plastic toothed belt 28A or 28B, respectively, and a bottom 42 of the guide track 30. When unwinding the roller blind web 16 from the winding shaft 20, the guide straps 38 therefore experience the at least nearly U-shaped reshaping when running into the guide rails 22A and 22B solely via the plastic toothed belts 28A and 28B, which are also running into the guide rails 22A and 22B, meaning without using further reshaping means. The roller blind web 16 along with its guide straps 38 are wound up wrinkle-free on the winding shaft 20: This is ensured by the elasticity of the material of the guide straps 38.

At the side of the guide track 30 facing away from the slot 40, namely after the U-shaped reshaping, the guide band 38 extends into a tab guide 44 with its free edge portion, said tab guide 44 being seen as a guide track for the free edge strip of the guide strap 38 and also extending over the length of the corresponding guide rail 22A or 22B, respectively.

The slot 40 is spaced from the bottom 42 as well as from a top 46 of the guide track 30.

Due to the U-shaped reshaping of the guide strap 38 in the guide track 30, the guide band 38 can get caught in the toothings 32 and 34 of the plastic toothed belt 28A or 28B, respectively. In particular the toothing 34, which is arranged outward in relation to the vertical longitudinal center plane of the roof, directly encroaches into the material or the fabric of the guide strap 38, respectively. Thus, high retaining forces can be applied which enable a wind-blocking function of the roller blind arrangement 14. Retaining bristles or the like at the toothed belts are not necessary: Rather, the toothed belts 28A and 28B are formed without bristles.

The guide straps 38, or the entire roller blind web 16 when formed in one piece, can be made of various materials, such as a knitted fabric, a woven fabric, a blackout fabric, or the like. The fabric can be specially treated in its engaging area, namely its guiding area which is arranged in the guide track 30, and be provided with a dressing, a coating, at least one strap and/or a specific seam. This treatment is realized through common production processes, such as sewing, welding, impregnating, coating, dressing or the like.

By using the standardized guide straps 38, identical friction partners can be realized, independent to the central portion 36, for the guide rails 22A and 22B and also for a guide tube arranged between the drive pinion 26 and the corresponding guide rail 22A or 22B, respectively, and a tapering tube for the corresponding tapering end of the plastic toothed belt 28A and 28B, respectively, arranged beyond the drive pinion 26.

Figure 4:
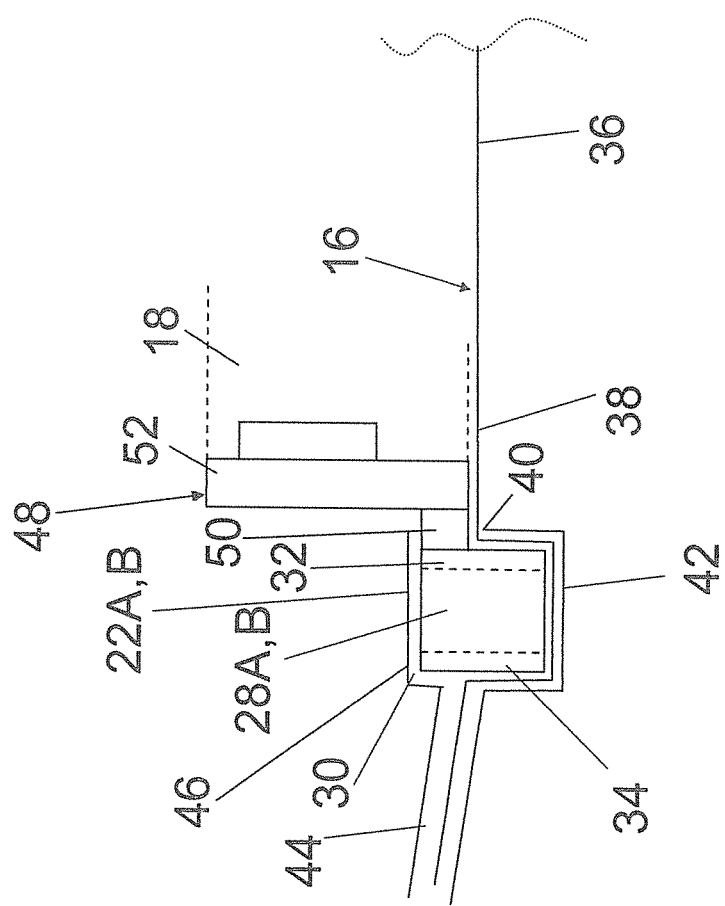
FIG. 4 shows a section that corresponds to FIG. 3 through an alternative embodiment of a roller blind arrangement.

In FIG. 4, an alternative embodiment of a roller blind arrangement according to the invention is shown. This roller blind arrangement is different to the embodiment shown in FIG. 3 in that it, in relation to the vertical longitudinal center plane of the roller blind, comprises in each case a guide rail 22A or 22B, respectively, on both sides which is provided with a guide track 30, which comprises a slot 40 at the side facing towards the longitudinal center plane of the roller blind and being distanced from a bottom 42 of the guide track 30 but reaching to a top 46 of the guide track 30. The roller blind web 16 is guided into the corresponding guide rail 22A or 22B, respectively, in the transverse direction via the slot 40. Moreover, this roller blind arrangement comprises toothed belts 28A and 28B which have an essentially square cross section, meaning its height/width ratio is approximately 1. In particular, the plastic toothed belts 28A and 28B have a height of approximately 5 mm in the case at hand.

Figure 2:
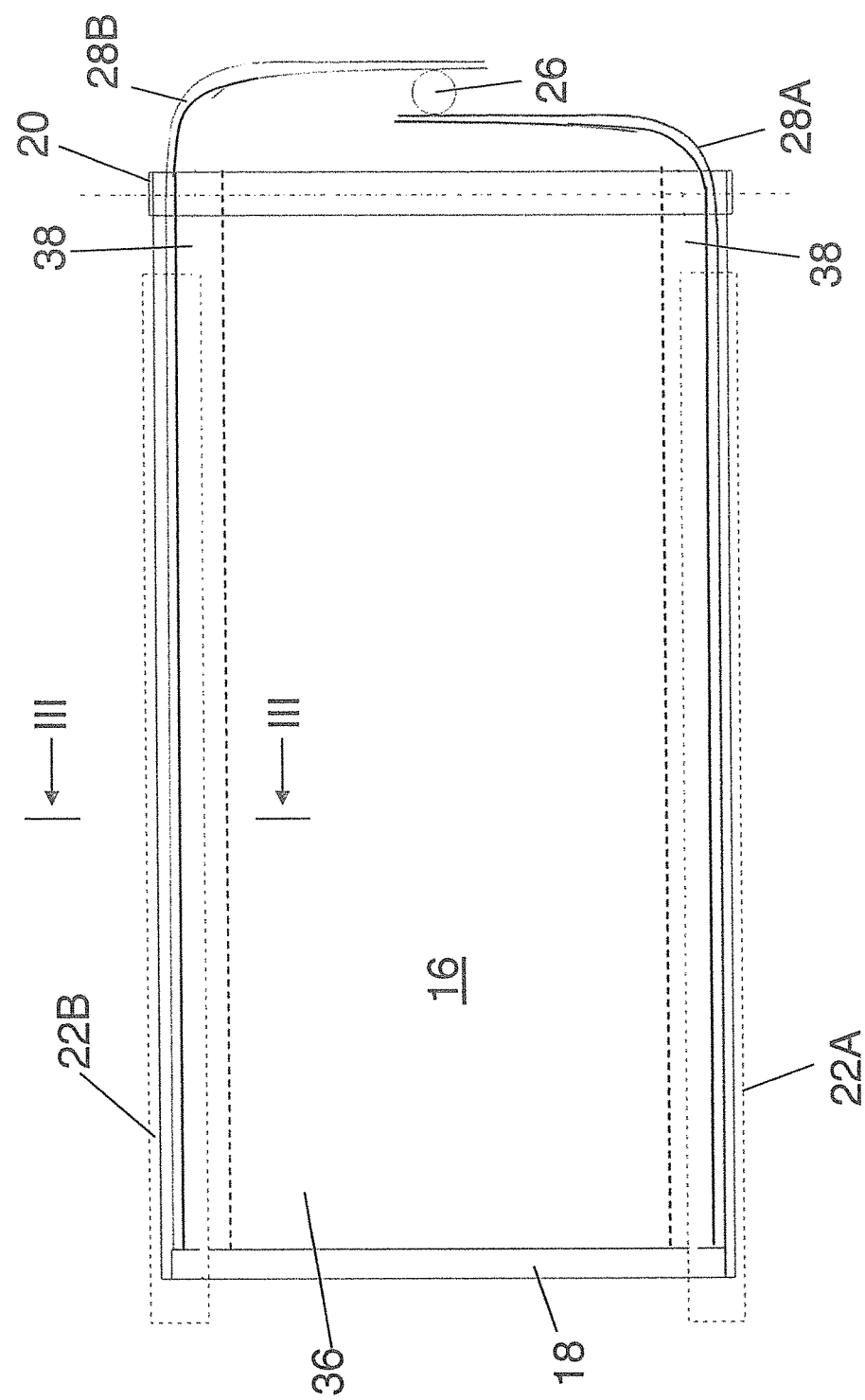
FIG. 2 shows a view from above onto the roller blind arrangement on its own.

As was the case in the embodiment according to FIGS. 1 to 3, lateral guide straps 38 of the roller blind 16, which are connected to a central portion 36 for example via a seam, are deviated in each case in an essentially U-shaped manner in the guide tracks 30 via the toothed belts 28A and 28B, so that said guide straps 38 are pressed between the corresponding plastic toothed belts 28A or 28B, respectively, and the bottom of the corresponding guide track 30. The toothings 32 and 34 have in each case teeth which extend perpendicular to the plane of the roller blind web 16 from an upper side of the toothed belt to a lower side of the toothed belt. As described in the embodiment above, the guide strap 38 of the roller blind web 16 can get caught in the toothings 32 and 34 of the plastic toothed belt 28A or 28B, respectively.

Furthermore, in the embodiment shown in FIG. 4, a coupling element 48 is formed at each of the plastic toothed belts 28A and 28B at the end facing away from the winding shaft according to an injection molding process. The coupling elements 48 serve to connect the toothed belts 28A and 28B, respectively, with the tension bow 18 and comprise a passage portion 50 which engages through the corresponding slot 40 of the corresponding guide rail 22A or 22B, respectively, and connects the corresponding plastic toothed belt 28A or 28B, respectively, with a connecting plate 52 fastened to the drive pinion 18.

For the rest, the embodiment according to FIG. 4 corresponds to the embodiment according to the FIGS. 1 to 3.

The invention claimed is:

1. A roller blind arrangement for a motor vehicle for shading a transparent vehicle section, comprising: a roller blind web which can be wound up to form a roller blind winding and is guided at its lateral edges in relation to a vertical longitudinal center plane of the roller blind in each case in a guide rail, as well as a drive device having a drive pinion which drives two driving means each of which is guided in a guide track of its corresponding guide rail, wherein the driving means are each designed as a toothed belt which has an essentially rectangular cross section and comprises a toothing on at least one side, the teeth of said toothing extending at least approximately perpendicular to a plane of the unwound roller blind web between a lower side of the toothed belt and an upper side of the toothed belt, wherein the roller blind web is pressed between the lower side of the toothed belt and a bottom of each corresponding guide track and, when viewed in transverse direction of the guide rail, is deviated in the guide track by the toothed belt at least approximately U-shaped or the roller blind web is pressed between the upper side of the toothed belt and a top of the guide track and, when viewed in transverse direction of the guide rail, is deviated in the guide track by the toothed belt at least approximately in a reverse U-shape.

2. The roller blind arrangement according to claim 1, wherein the guide tracks have in each case an essentially rectangular cross section and in that the roller blind web is inserted into the guide tracks via a corresponding lateral slot and is arranged in the guide tracks between the corresponding guide rails and the corresponding toothed belt.

3. The roller blind arrangement according to claim 2, wherein the slot is spaced from the bottom of the corresponding guide track and extends to the top of the corresponding guide track or in that the slot is spaced from the top of the corresponding guide track and extends to the bottom of the corresponding guide track.

4. The roller blind arrangement according to claim 2, wherein the slot is spaced from the bottom or the top of the corresponding guide track.

5. The roller blind arrangement according to claim 4, wherein the guide tracks comprise a tab guide at the side facing away from the slot, a corresponding edge of the roller blind web engaging into said tab guide.

6. The roller blind arrangement according to claim 1, wherein the toothed belts each comprise toothings on two sides facing away from each other.

7. The roller blind arrangement according to claim 1, wherein the roller blind web comprises a guide strap at each lateral edge in relation to a vertical longitudinal center plane of the roller blind, said guide strap being connected to a central portion of the roller blind web and is guided in the corresponding guide rail.

8. The roller blind arrangement according to claim 1, wherein the toothed belts are each guided between the drive pinion and the corresponding guide rail without torsion.

9. The roller blind arrangement according to claim 1, wherein the toothed belts have in each case a cross section whose height/width ratio is between 0.9 and 1.1, preferably approximately 1.

10. The roller blind arrangement according to claim 1, wherein the toothed belts have in each case a height between approximately 4 mm and 8 mm.

11. The roller blind arrangement according to claim 1, wherein the driving means are each guided to a tension bow which is arranged at the edge of the roller blind web facing away from the roller blind winding.

12. The roller blind arrangement according to claim 11, wherein the tension bow is provided with a coupling element on both sides in relation to the longitudinal center plane of the roller blind which is connected to the corresponding toothed belt.

13. The roller blind arrangement according to claim 12, wherein the coupling elements each engage into a recess of the corresponding toothed belt in an interlocking manner.

14. The roller blind arrangement according to claim 12, wherein the coupling elements are each formed onto the corresponding toothed belt according to an injection molding method.

* * * * *